Feb. 25, 1930.  J. A. ADELL  1,748,693

OUTLET BOX

Filed Sept. 3, 1926

Inventor
John A. Adell
By Attorneys
Southgate Fay & Hanley.

Patented Feb. 25, 1930

1,748,693

UNITED STATES PATENT OFFICE

JOHN A. ADELL, OF ORANGE, MASSACHUSETTS

OUTLET BOX

Application filed September 3, 1926. Serial No. 133,460.

This invention relates to an outlet box for use in electrical work and to means for connecting it with a supporting rod.

The principal objects of the invention are to provide a sheet metal box holding within it all the accessories; to provide a simple and convenient clamping plate for the cables which enter the box; to provide accessible means entirely within the box for holding the same in position; and to provide a simple arrangement in the box for holding the box on the rod which supports it so as to avoid a separate holding means.

Other objects and advantages of the invention will appear hereinafter.

Reference is to be had to the accompanying drawings, in which

Figures 1, 2:
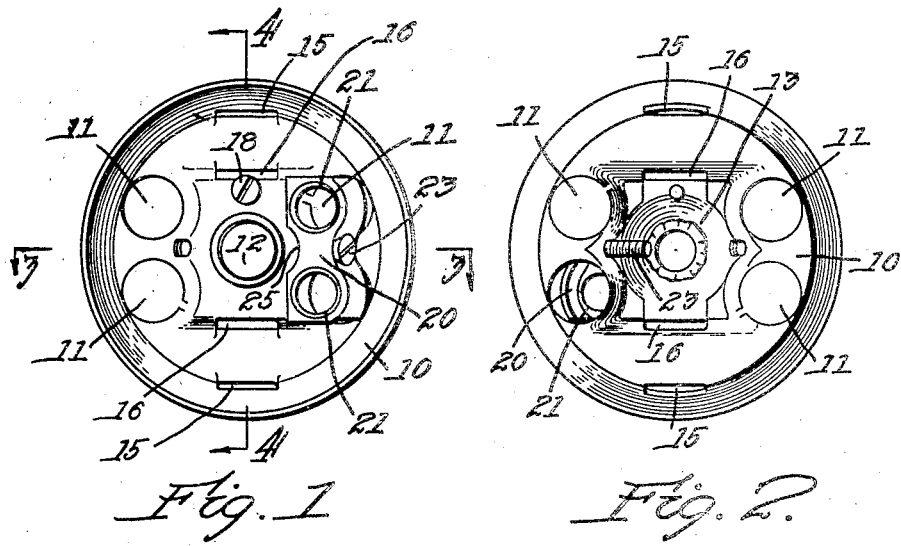
Fig. 1 is a bottom plan view of an outlet box constructed in accordance with this invention with one clamping plate and the supporting bar omitted to show the interior construction.
Fig. 2 is a top plan view of the same.
Figure 3:
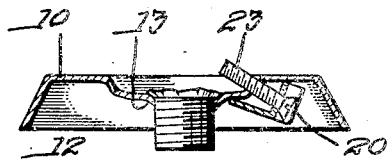
Fig. 3 is a sectional view on the line 3—3 of Fig. 1.
Figure 4:
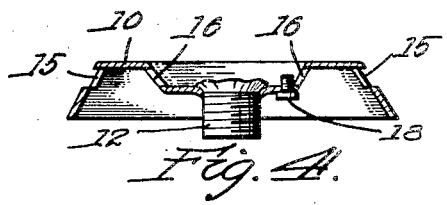
Fig. 4 is a sectional view on the line 4—4 of Fig. 1.

I have shown the box as in the form of a cup-shaped sheet metal member 10 having a substantially flat top with a central depression and a conical rim. This box is provided with a series of punched out discs 11 in the top, each one being connected with it, in the manufacture by a small section, so that it can easily be pushed through and removed to permit the entrance of such conductors as may be desired in the usual way.

The top is provided with a central depression and a hollow sheet metal stud 12 extending downwardly from it, for centrally securing it into a supported element. This is formed of a separate piece preferably, or otherwise. It is mounted on a convex central shoulder 13 of a general circular form at the center, but provided with square corners for a purpose that will appear.

Through the conical wall of the box are two opposite flat openings 15 and through the shoulder 13 there are also two opposite openings 16 in alignment with the other openings. This permits a supporting rod 17 to pass through these four openings and to be located entirely below the flat bottom of the box where it passes between the openings 15 and 16 on each side. This construction provides a positive support extending through the walls of the box and necessarily holding it up at all times. It furnishes a positive support not dependent on screws, springs or other external supports. The box is secured in adjusted positions to the rod by a set screw 18.

For the purpose of holding the wires or cables in proper position I have shown two clips 20 on opposite sides. These clips are made of pressed sheet stock and each one has two openings 21 therethrough for the cables. Each clip is secured in position by a screw 23, extending in on an incline. On the edge of the clip which comes in contact with the convex surface of the shoulder 13 is provided an arcuate notch 25. On this account these clips can be screwed up in close contact with this convex shoulder and will be held fixedly in position thereon. No great pains has to be taken in placing them as they necessarily center themselves against this convex surface and are largely self-adjusting.

The device is used in the ordinary way for holding the wire or cables that are brought in through the openings at 11.

Figure 5:
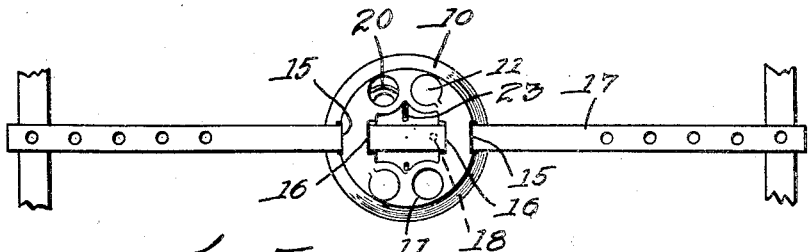
Fig. 5 is a plan similar to Fig. 2 on a reduced scale showing the box mounted on its supporting rod.

This furnishes a very simple construction and is particularly valuable because the electrician who puts it up can reach the heads of the screws 23 right under the edge or cup-shaped disc and need not devote any particular attention to the clips 20 as they will come into the right position because of their cooperation with the convex shoulder 13. These screws pass out of the box at such an incline that they do not interfere with the supporting rod 17. This rod is mounted substantially within the confines of the box and does not constitute a projection either above or below it. It can be secured to the wooden parts of the building in the manner indicated in Fig. 5.

Although I have illustrated and described only a single form of the invention, I am aware of the fact that modifications can be made therein by any person skilled in the art without departing from the scope of the invention as expressed in the claim.

What I claim is:—

As an article of manufacture, an outlet box having a flat wall constituting the top and a central projection extending downwardly from the top, said top having a shoulder on the lower side which is convex on the lower side and circular, a clip for holding the wires or cables, having two perforations, and an arcuate notch adapted to fit against said convex shoulder, and means for holding the clips against said convex shoulder.

In testimony whereof I have hereunto affixed my signature.

JOHN A. ADELL.